(12) United States Patent
Tanaka et al.

(10) Patent No.: US 11,798,579 B2
(45) Date of Patent: Oct. 24, 2023

(54) DEVICE, METHOD, AND PROGRAM FOR ANALYZING SPEECH SIGNAL

(71) Applicant: NIPPON TELEGRAPH AND TELEPHONE CORPORATION, Tokyo (JP)

(72) Inventors: Ko Tanaka, Tokyo (JP); Hirokazu Kameoka, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 122 days.

(21) Appl. No.: 16/970,896

(22) PCT Filed: Feb. 19, 2019

(86) PCT No.: PCT/JP2019/006047
§ 371 (c)(1),
(2) Date: Aug. 18, 2020

(87) PCT Pub. No.: WO2019/163753
PCT Pub. Date: Aug. 29, 2019

(65) Prior Publication Data
US 2020/0395041 A1 Dec. 17, 2020

(30) Foreign Application Priority Data
Feb. 20, 2018 (JP) ................. 2018-028295

(51) Int. Cl.
*G10L 25/69* (2013.01)
*G10L 15/14* (2006.01)
(Continued)

(52) U.S. Cl.
CPC ............ *G10L 25/69* (2013.01); *G10L 15/142* (2013.01); *G10L 15/16* (2013.01); *G10L 25/30* (2013.01); *G10L 25/75* (2013.01)

(58) Field of Classification Search
CPC ....... G10L 25/69; G10L 15/142; G10L 15/16; G10L 25/30; G10L 25/75; G10L 25/90
See application file for complete search history.

(56) References Cited

U.S. PATENT DOCUMENTS 9,842,105 B2* 12/2017 Bellegarda ............. G06N 3/045
2009/0204395 A1* 8/2009 Kato ..................... G10L 13/033
704/E11.001
(Continued)

FOREIGN PATENT DOCUMENTS

WO 2017/1168870 A1 10/2017

OTHER PUBLICATIONS

Kameoka et al (Generative Modeling of Voice Fundamental Frequency Contours, IEEE/ACM transactions on audio/speech/language processing, pp. 1042-1053, 2015) (Year: 2015).*
(Continued)

*Primary Examiner* — Michael N Opsasnick

(57) ABSTRACT

A parameter included in a fundamental frequency pattern of a voice can be estimated from the fundamental frequency pattern with high accuracy and the fundamental frequency pattern of the voice can be reconstructed from the parameter included in the fundamental frequency pattern. A learning unit 30 learns a deep generation model including an encoder which regards a parameter included in a fundamental frequency pattern in a voice signal as a latent variable of the deep generation model and estimates the latent variable from the fundamental frequency pattern in the voice signal on the basis of parallel data of the fundamental frequency pattern in the voice signal and the parameter included in the fundamental frequency pattern in the voice signal, and a decoder which reconstructs the fundamental frequency pattern in the voice signal from the latent variable.

20 Claims, 4 Drawing Sheets

(51) Int. Cl.
  *G10L 15/16* (2006.01)
  *G10L 25/30* (2013.01)
  *G10L 25/75* (2013.01)

(56) References Cited

U.S. PATENT DOCUMENTS

| | | | |
|---|---|---|---|
| 2017/0132509 A1* | 5/2017 | Li | G06N 3/045 |
| 2017/0270919 A1* | 9/2017 | Parthasarathi | G10L 17/18 |
| 2018/0144746 A1* | 5/2018 | Mishra | G06V 40/172 |
| 2018/0151177 A1* | 5/2018 | Gemmeke | G10L 15/22 |
| 2018/0268806 A1* | 9/2018 | Chun | G10L 13/047 |

OTHER PUBLICATIONS

Fujisaki, Hiroya, "A Note on the Physiological and Physical Basis for the Phrase and Accent Components in the Voice Fundamental Frequency Contour," Vocal Physiology; Voice Production. Mechanisms and Functions, Raven Press. Ltd., New York, 1988.

Lee, S. W., et al., "Generalized F0 Modelling with Absolute and Relative Pitch Features for Singing Voice Synthesis," ICASSP 978-1-4673-0046-9/12 IEEE.

Ohishi, Yasunori, et al., "A Stochastic Model of Singing Voice F0 Contours for Characterizing Expessive Dynamic Components," Thirteenth Annual Conference of the International Speech Communication Association, Sep. 9, 2012.

Kameoka, Hirokazu, et al., "Generative Modeling of Voice Fundamental Frequency Contours," IEEE/ACM Transactions on Audio, Speech, and Language Processing, vol. 23, No. 6, Jun. 2015.

Hiroshi, Tanaka, et al., "Vee-Space: Deep Generation Model of Voice F0 Pattern," Japan Acoustical Society Lectures, Mar. 2018.

* cited by examiner

DEVICE, METHOD, AND PROGRAM FOR ANALYZING SPEECH SIGNAL

CROSS-REFERENCE TO RELATED APPLICATIONS

This application is a U.S. 371 Application of International Patent Application No. PCT/JP2019/006047, filed on 19 Feb. 2019, which application claims priority to and the benefit of JP Application No. 2018-028295, filed on 20 Feb. 2018, the disclosures of which are hereby incorporated herein by reference in their entireties.

TECHNICAL FIELD

The present invention relates to a voice signal analysis apparatus, method and program and, particularly, to a voice signal analysis apparatus, method and program for analyzing a voice signal.

BACKGROUND ART

A fundamental frequency ($F_0$) pattern of a voice includes non-language information as well as language. For example, an interrogative sentence is represented by changing an $F_0$ pattern of the ending of an utterance sentence and an intention or an emotion is represented by changing dynamics of an $F_0$ pattern. In addition, with respect to a singing voice, an $F_0$ pattern is changed in order to represent a melody, an emotion and the personality of a singer. Accordingly, $F_0$ pattern modeling is considerably effective to realize expressive voice/singing voice synthesis and conversation systems, speakers, emotion recognition, and the like.

An $F_0$ pattern of a voice is composed of a component which moderately changes over an entire prosodic phrase (a phrase component) and a component which abruptly changes according to accent (an accent component). These components can be interpreted to correspond to a translational motion and a rotational motion of the human thyroid cartilage, and a mathematical model (hereinafter, Fujisaki model) that represents a logarithmic $F_0$ pattern as the sum of these components on the basis of this interpretation has been proposed (NPL 1). It is known that the Fujisaki model has occurrence times and durations of phrase and accent commands, the size of each command, and the like as parameters and approximates an actually measured $F_0$ pattern very well when the parameters are appropriately set. Furthermore, since the validity of linguistic compliance with these parameters has been widely confirmed, the Fujisaki model is useful if the parameters of the Fujisaki model can be estimated from the actually measured $F_0$ pattern with high accuracy. On the other hand, in modeling of an $F_0$ pattern of a singing voice (NPLs 2 and 3), the $F_0$ pattern is represented by mixing a plurality of components such as overshoot and vibrato as in the Fujisaki model. Although all the above-described models have a common feature with respect to handling of a voice generation process and an inverse problem thereof, such as estimation of parameters in an $F_0$ pattern from the $F_0$ pattern, and methods for solving the inverse problem using the hidden Markov model (HMM) (NPLs 2 to 4) have been proposed, a calculation cost is high because estimation needs to be repeatedly performed and there is room for improvement in estimation accuracy, and furthermore, it is necessary to change the structure and algorithm of a model using manpower according to languages, speakers and the like.

Recently, a deep generation model such as Variational AutoEncoder (VAE) has been proposed in the field of deep learning. As the name indicates, a VAE is a probability model of an autoencoder including an encoder and a decoder described by a neural network. The encoder estimates latent variables of an input (e.g., a voice or an image) when the input is applied and the decoder reconstructs the input when the latent variables are applied. Since there is an assumption that latent variables follow a probability distribution, the VAE is a probability model. Although it is assumed that latent variables follow a normal distribution in the conventional VAE, if latent variables that can be assumed to follow an interpretable significant distribution can be prepared, the decoder therefor can be a powerful generation model for associating observation data with interpretable parameters included in the observation data (e.g., a generation model such as the Fujisaki model for associating an $F_0$ pattern with phrase and accent components). Furthermore, since the VAE has restriction that the encoder and the decoder should be simultaneously trained, it is possible to simultaneously solve the voice generation process and the inverse problem thereof, for example, by using the aforementioned interpretable parameters. In addition, when it is difficult to collect learning data (e.g., when a large number of $F_0$ patterns can be prepared but large amounts of manpower and time are necessary to collect a large number of parameters included therein), it is possible to perform semi-supervised learning using a VAE.

CITATION LIST

Non Patent Literature

[NPL 1] Hiroya Fujisaki, "A note on the physiological and physical basis for the phrase and accent components in the voice fundamental frequency contour", Vocal physiology: Voice production, mechanisms and functions, pp. 347-355, 1988.

[NPL 2] Siu Wa Lee, Shen Ting Ang, Minghui Dong, and Haizhou Li, "Generalized f0 modelling with absolute and relative pitch features for singing voice synthesis", in Acoustics, Speech and Signal Processing (ICASSP), 2012 IEEE International Conference on. IEEE, 2012, pp. 429-432.

[NPL 3] Yasunori Ohishi, Hirokazu Kameoka, Daichi Mochihashi, and Kunio Kashino, "A stochastic model of singing voice f0 contours for characterizing expressive dynamic components", in Thirteenth Annual Conference of the International Speech Communication Association, 2012.

[NPL 4] Hirokazu Kameoka, Kota Yoshizato, Tatsuma Ishihara, Kento Kadowaki, Yasunori Ohishi, and Kunio Kashino, "Generative modeling of voice fundamental frequency contours", IEEE/ACM Transactions on Audio, Speech, and Language Processing, vol. 23, no. 6, pp. 1042-1053, 2015.

SUMMARY OF THE INVENTION

Technical Problem

An object of the present invention is to provide a voice signal analysis apparatus, method and program which can estimate a parameter included in a fundamental frequency pattern of a voice from the fundamental frequency pattern with high accuracy and reconstruct the fundamental frequency pattern of the voice from the parameters included in the fundamental frequency pattern.

Means for Solving the Problem

To accomplish the aforementioned object, a voice signal analysis apparatus according to the present invention includes: a learning unit which learns a deep generation model including an encoder which regards a parameter included in a fundamental frequency pattern in a voice signal as a latent variable of the deep generation model and estimates the latent variable from the fundamental frequency pattern in the voice signal on the basis of parallel data of the fundamental frequency pattern in the voice signal and the parameter included in the fundamental frequency pattern in the voice signal, and a decoder which reconstructs the fundamental frequency pattern in the voice signal from the latent variable; a parameter estimation unit which estimates, from a fundamental frequency pattern in an input voice signal, the parameter included in the fundamental frequency pattern using the encoder of the deep generation model; and a fundamental frequency pattern estimation unit which estimates, from a parameter included in the fundamental frequency pattern in the input voice signal, the fundamental frequency pattern using the decoder of the deep generation model.

In a voice signal analysis method according to the present invention: a learning unit learns a deep generation model including an encoder which regards a parameter included in a fundamental frequency pattern in a voice signal as a latent variable of the deep generation model and estimates the latent variable from the fundamental frequency pattern in the voice signal on the basis of parallel data of the fundamental frequency pattern in the voice signal and the parameter included in the fundamental frequency pattern in the voice signal, and a decoder which reconstructs the fundamental frequency pattern in the voice signal from the latent variable; a parameter estimation unit estimates, from a fundamental frequency pattern in an input voice signal, a parameter included in the fundamental frequency pattern using the encoder of the deep generation model; and a fundamental frequency pattern estimation unit estimates, from a parameter included in a fundamental frequency pattern in an input voice signal, the fundamental frequency pattern using the decoder of the deep generation model.

Furthermore, a program according to the present invention is a program for causing a computer to serve as each unit of the aforementioned voice signal analysis apparatus according to the invention.

Effects of the Invention

According to the voice signal analysis apparatus, method and program of the present invention, it is possible to obtain the effects that a parameter included in a fundamental frequency pattern of a voice can be estimated from the fundamental frequency pattern with high accuracy and the fundamental frequency pattern of the voice can be reconstructed from the parameter included in the fundamental frequency pattern by learning a deep generation model including an encoder which regards a parameter included in a fundamental frequency pattern in a voice signal as a latent variable of the deep generation model and estimates the latent variable from the fundamental frequency pattern in the voice signal on the basis of parallel data of the fundamental frequency pattern in the voice signal and the parameter included in the fundamental frequency pattern in the voice signal, and a decoder which reconstructs the fundamental frequency pattern in the voice signal from the latent variables.

DESCRIPTION OF EMBODIMENTS

Figure 1:
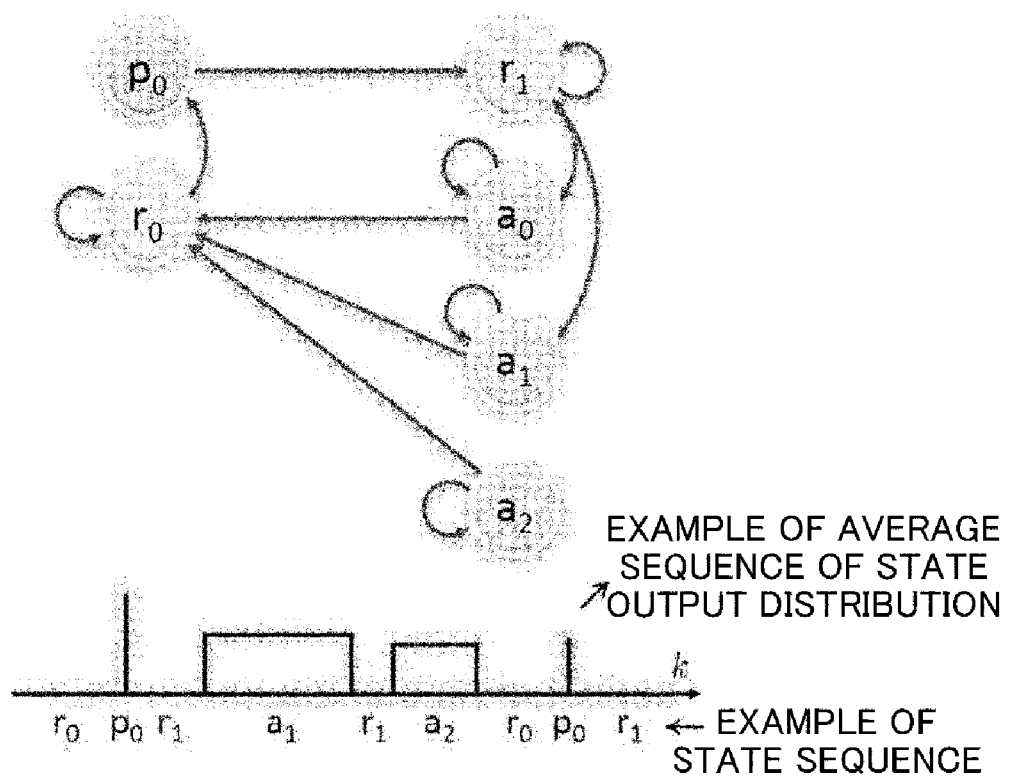
FIG. 1 is a diagram showing an example of a state transition network of an HMM.

Hereinafter, an embodiment of the present invention will be described in detail with reference to the drawings. A technology proposed in an embodiment of the present invention belongs to a technical field of signal processing and is a signal processing technology for solving a problem of estimating a parameter included in a fundamental frequency pattern of a voice from the fundamental frequency pattern and forward problems thereof.

Here, related technologies 1 and 2 in an embodiment of the present invention will be described.

<Related Technology 1: $F_0$ Pattern Generation Process Model of Voice>

First, an $F_0$ pattern generation process model of a voice will be described.

As a model describing a process of generating an $F_0$ pattern of a voice, the fundamental frequency ($F_0$) pattern generation process model of Fujisaki (Fujisaki model) is known (NPL 1). The Fujisaki model is a physical model describing an $F_0$ pattern generation process according to the motion of the thyroid cartilage. In the Fujisaki model, the sum of stretches of vocal cords involved in two independent motions (translational motion and a rotational motion) of the thyroid cartilage is interpreted to cause time variance of $F_0$ and an $F_0$ pattern is modeled on the basis of the assumption that stretch of vocal cords and a logarithmic value y(t) of the $F_0$ pattern are in a proportional relation. An $F_0$ pattern $x_p(t)$ generated by the translational motion of the thyroid cartilage is referred to as a phrase component and an $F_0$ pattern $x_a(t)$ generated by the rotational motion is referred to as an accent component. In the Fujisaki model, an $F_0$ pattern y(t) is obtained by adding a baseline component $\mu_b$ determined according to physical limitations of vocal cords to the aforementioned components and is represented as follows.

[Formula 1]

$$y(t)=x_p(t)+x_a(t)+\mu_b \qquad (1)$$

The two components are assumed as outputs of a secondary critical braking system and are represented as follows.

[Formula 2]

$$x_p(t) = g_p(t) * u_p(t), \quad (2)$$

$$g_p(t) = \begin{cases} \alpha^2 t e^{-\alpha t} & (t \geq 0) \\ 0 & (t < 0) \end{cases}, \quad (3)$$

$$x_a(t) = g_a(t) * u_a(t), \quad (4)$$

$$g_a(t) = \begin{cases} \beta^2 t e^{-\beta t} & (t \geq 0) \\ 0 & (t < 0) \end{cases}, \quad (5)$$

(* represents a convolution operation with respect to a time t). Here, $u_p(t)$ is called a phrase command function and composed of a string of delta functions (phrase commands) and $u_a(t)$ is called an accent command function and is composed of a string of square waves (accent commands). These command strings have constraint conditions that a phrase command is generated at the beginning of an utterance, two phrase commands are not consecutively generated, and two different commands are not generated at the same time. In addition, α and β are natural angular frequencies of a phrase control mechanism and an accent control mechanism and it is empirically known that they are approximately α=3 rad/s and β=20 rad/s regardless of a speaker and details of an utterance.

<Related Technology 2: $F_0$ Pattern Generation Process Model of Singing Voice>

Next, an $F_0$ pattern generation process model of a singing voice will be described.

Control of abrupt rising and falling of a fundamental frequency involved in a melody of a singing voice and periodic vibration such as vibrato cannot be represented in a critical braking system such as the above-described Fujisaki model. Accordingly, in an $F_0$ control model of a singing voice,

[Formula 3]

$$G(s) = \frac{\Omega^2}{s^2 + 2\zeta\Omega s + \Omega^2} \quad (6)$$

various oscillatory phenomena composed of exponent attenuation (ζ>1), attenuated vibration (0<ζ<1, corresponding to overshoot), critical braking (ζ=1), and steady-state vibration (ζ=0, corresponding to vibrato) are represented by adjusting the attenuation factor ζ in a transfer function of a secondary system represented by Equation (6) above using control parameters (an attenuation factor and a natural frequency Ω).

Principle According to Embodiment of the Present Invention

A technology of an embodiment of the present invention includes learning processing and estimation processing.

<Learning Processing>

In learning processing, it is assumed that parallel data of an $F_0$ pattern (e.g., an $F_0$ pattern of a voice) and a parameter (e.g., phrase and accent components) included in the $F_0$ pattern or data of which a part is parallel data is provided.

First, a latent variable z is assumed to be a parameter in charge of an $F_0$ pattern generation process. For example, it corresponds to phrase and accent components in the case of the Fujisaki model. By approximating a conditional probability distribution $P_\theta(x|z)$ of an $F_0$ pattern x with respect to predetermined z through a decoder described with a neural network, a posterior probability $P_\theta(z|x)$ thereof can be regarded as an inverse problem of estimating z when the predetermined $F_0$ pattern x is provided. Since it is difficult to precisely obtain the posterior probability, a conditional probability distribution $Q_\varphi(z|x)$ of x is approximated through an encoder described with the neural network. By learning the aforementioned encoder and decoder, the conditional probability distribution $Q_\varphi(z|x)$ of x is consistent with a true posterior probability $P_\theta(z|x) \propto P_\theta(x|z)P(z)$. A logarithmic marginal probability density function $\log P_\theta(x)$ with respect to the $F_0$ pattern x is represented as follows.

[Formula 4]

$$\log P_\theta(x) = \mathcal{L}(\theta, \phi; x) + D_{KL}[Q_\phi(z|x) \| P_\theta(z|x)], \quad (7)$$

$$\mathcal{L}(\theta, \phi; x) = \underbrace{-D_{KL}[Q_\phi(z|x) \| P(z)]}_{\text{Regularization term over } z} + \underbrace{\mathbb{E}_{Q_\phi(z|x)}[\log P_\theta(x|z)]}_{\text{Reconstruction term}} \quad (8)$$

Here, $D_{KL}[\cdot|\cdot]$ represents a Kullback-Leibler (KL) distance. It can be ascertained from Equation (8) that a KL distance between $P_\theta(z|x)$ and $Q_\varphi(z|x)$ can be minimized by maximizing $L(\theta,\varphi;x)$ with respect to θ and φ. In the conventional typical VAE, $Q_\varphi(z|x)$ and $P_\theta(x|z)$ are assumed to be a single normal distribution (NPLs 5 and 6).

[NPL 5] Diederik P Kingma and Max Welling, "Auto-encoding variational bayes", arXiv preprint arXiv: 1312.6114, 2013.

[NPL 6] Casper Kaae Sonderby, Tapani Raiko, Lars Maaloe, Soren Kaae Sonderby, and Ole Winther, "Ladder variational autoencoders", in Advances in Neural Information Processing Systems, 2016, pp. 3738-3746.

Here, a specific form with respect to P(z) that is a prior distribution can be designed by setting the latent variable z as a specific interesting variable. For example, when the latent variable z is associated with phrase and accent components as described above, P(z) can be represented as $P(z)=\Sigma_s P(z|s)P(s)$. Meanwhile, s represents a state sequence of the path-restricted HMM (refer to FIG. 1) described in the aforementioned NPL 4. That is, the natural latent variable z is estimated in order to represent a predetermined $F_0$ pattern in consideration of natural duration of phrase and accent commands modeled by the path-restricted HMM.

<Estimation Processing>

In processing of estimating a parameter z included in a predetermined $F_0$ pattern x from the $F_0$ pattern, a posterior distribution with respect to z is obtained using the above-described encoder $Q_\varphi(z|x)$ and an average sequence at the time is regarded as z. Processing of estimating the $F_0$ pattern x from the parameter z included in the predetermined $F_0$ pattern is obtained using the above-described decoder $P_\theta(x|z)$. Since the encoder and the decoder are described through a CNN, repeated execution as in the conventional technology is not required and parallel operations in each batch of the CNN can be performed, and thus fast estimation can be achieved.

<System Configuration>

Figure 2:
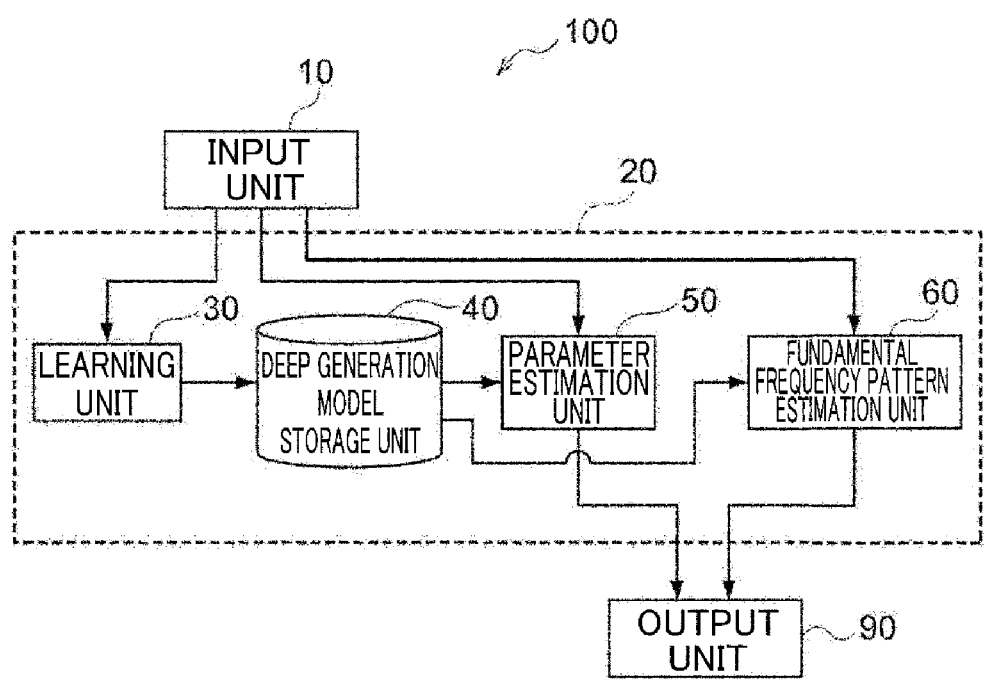
FIG. 2 is a block diagram showing a configuration of a voice signal analysis apparatus according to an embodiment of the present invention.

As shown in FIG. 2, a voice signal analysis apparatus according to an embodiment of the present invention is composed of a computer including a CPU, a RAM, and a ROM storing a program for executing each processing routine and is functionally configured as follows.

As shown in FIG. 2, the voice signal analysis apparatus 100 includes an input unit 10, an operation unit 20, and an output unit 90.

The input unit 10 receives parallel data of a fundamental frequency pattern in a voice signal and a parameter included in the fundamental frequency pattern in the voice signal. In addition, the input unit 10 receives a parameter included in a fundamental frequency pattern in a voice signal that is an estimation object. Further, the input unit 10 receives the fundamental frequency pattern in the voice signal that is the estimation object.

Meanwhile, a fundamental frequency pattern is acquired by extracting a fundamental frequency from a voice signal using fundamental frequency extraction processing that is a known technology.

The operation unit 20 includes a learning unit 30, a deep generation model storage unit 40, a parameter estimation unit 50, and a fundamental frequency pattern estimation unit 60.

The learning unit 30 learns a deep generation model including an encoder and a decoder described below.

Encoder: regards a parameter included in a fundamental frequency pattern in a voice signal as a latent variable of the deep generation model on the basis of parallel data of the fundamental frequency pattern in the voice signal received through the input unit 10 and the parameter included in the fundamental frequency pattern in the voice signal and estimates the latent variable from the fundamental frequency parameter in the voice signal.

Decoder: reconstructs the fundamental frequency pattern in the voice signal from the latent variable.

Specifically, a decoder $P_\theta(x|z)$ and an encoder $Q_\varphi(z|x)$ of the deep generation model are learnt such that the objective function of the aforementioned equation (8) defined using a distance between an output of a decoder having a fundamental frequency pattern in a voice signal as an input and a prior distribution of the parameter represented using a state sequence of a path-restricted hidden Markov model (HMM) and an output of an encoder having a latent variable as an input is maximized.

Here, the state sequence of the path-restricted hidden Markov model (HMM) is a state sequence s estimated from the fundamental frequency pattern and composed of a state sk of each time k in the HMM.

Here, in the state sequence of the path-restricted HMM, as shown in FIG. 1, a state $p_0$ in which a phrase command is generated, a plurality of states $a_n$ in which an accent command is generated, and states $r_0$ and $r_1$ in which any of a phrase command and an accent command is not generated are included, and the states are connected such that transition from the state $r_0$ through the state $p_0$ to the state $r_1$ and transition from the state $r_1$ through any of the plurality of states $a_n$ to the state $r_0$ occur.

In addition, each of the decoder $P_\theta(x|z)$ and the encoder $Q_\varphi(z|x)$ of the deep generation model is configured using a convolutional neural network.

The decoder $P_\theta(x|z)$ and the encoder $Q_\varphi(z|x)$ of the deep generation model trained by the learning unit 30 are stored in the deep generation model storage unit 40.

The parameter estimation unit 50 estimates, from the fundamental frequency pattern in the voice signal that is the estimation object input thereto, the parameter included in the fundamental frequency pattern using the encoder $Q_\varphi(z|x)$ of the deep generation model and outputs the parameter to the output unit 90.

The fundamental frequency pattern estimation unit 60 estimates the fundamental frequency pattern from the parameter included in the fundamental frequency pattern in the voice signal that is the estimation target input thereto using the decoder $P_\theta(x|z)$ of the deep generation model and outputs the fundamental frequency pattern to the output unit 90.

<Operation of Voice Signal Analysis Apparatus>

Next, the operation of the voice signal analysis apparatus 100 according to an embodiment of the present invention will be described. First, when the input unit 10 receives parallel data of a fundamental frequency pattern in a voice signal and a parameter included in the fundamental frequency pattern in the voice signal, the learning unit 30 of the voice signal analysis apparatus 100 learns a deep generation model including an encoder $Q_\varphi(z|x)$ which estimates a latent variable from the fundamental frequency pattern in the voice signal and a decoder $P_\theta(x|z)$ which reconstructs the fundamental frequency pattern in the voice signal from the latent variable, and stores the deep generation model in the deep generation model storage unit 40.

Next, when the input unit 10 receives a fundamental frequency pattern in a voice signal that is an estimation object, the parameter estimation unit 50 of the voice signal analysis apparatus 100 estimates a parameter included in the fundamental frequency pattern in the voice signal that is the estimation object from the fundamental frequency pattern using the encoder $Q_\varphi(z|x)$ of the deep generation model and outputs the parameter to the output unit 90.

In addition, when the input unit 10 receives a parameter included in a fundamental frequency pattern in a voice signal that is an estimation object, the parameter estimation unit 50 of the voice signal analysis apparatus 100 estimates the fundamental frequency pattern from the parameter included in the fundamental frequency pattern of the input voice signal that is the estimation object using the decoder $P_\theta(x|z)$ of the deep generation model and outputs the fundamental frequency pattern to the output unit 90.

Effects of Experiments of Present Embodiment

Example 1 of Effects

Figure 3:
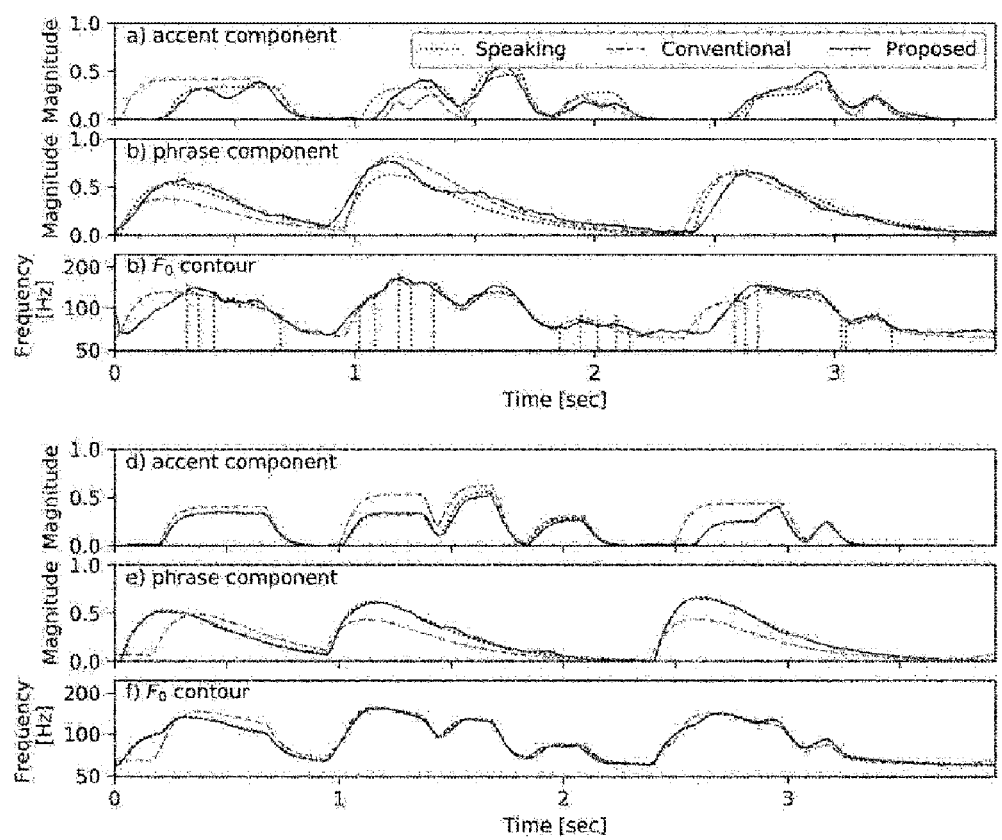
FIG. 3 is a diagram showing an example of effects of experiments of an embodiment of the present invention.

An $F_0$ pattern was extracted from a voice signal and data of phrase and accent components was generated from the $F_0$ pattern using manpower. After learning of the aforementioned model (deep generation model) using parallel data of the $F_0$ pattern and the phrase and accent components, experiments of estimating phrase and accent components from the $F_0$ pattern through estimation processing and estimating the $F_0$ pattern from the phrase and accent components were performed, and to what degree the estimated $F_0$ pattern and phrase and accent components restored the original $F_0$ pattern and phrase and accent components was confirmed. FIG. 3 shows an example of the result. It can be confirmed that the $F_0$ pattern and the phrase and accent components can be reproduced with high accuracy as compared to the conventional technology.

Example 2 of Effects

Figure 4:
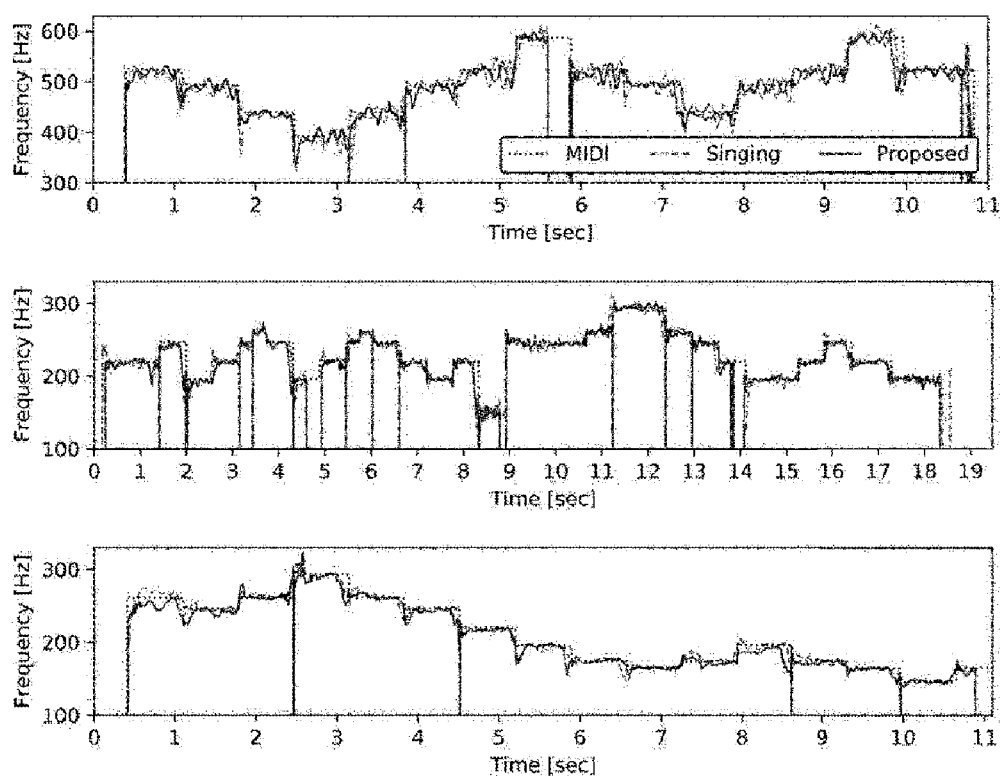
FIG. 4 is a diagram showing an example of effects of experiments of an embodiment of the present invention.

An $F_0$ pattern was extracted from a singing voice signal and notes were extracted from a musical piece signal thereof to generate parallel data. After learning of a singer dependency model of the aforementioned model (deep generation model) for each singer using the parallel data of the $F_0$ pattern and the notes, experiments of estimating an $F_0$ pattern from the notes through estimation processing were performed, and to what degree the estimated $F_0$ pattern restored the original $F_0$ pattern was confirmed. FIG. 4 shows an example of the result. It is confirmed that vibrato and overshoot were satisfactorily estimated even when only the notes were used as input information. In addition, it can be confirmed that an $F_0$ pattern that captured characteristics of a singer was estimated for each singer.

As described above, according to the voice signal analysis apparatus according to an embodiment of the present invention, it is possible to estimate a parameter included in a fundamental frequency pattern of a voice from the fundamental frequency pattern with accuracy and reconstruct the fundamental frequency pattern of the voice from the parameter included in the fundamental frequency pattern by learning the deep generation model including the encoder and the decoder described below.

Decoder: regards a parameter included in a fundamental frequency pattern in a voice signal as a latent variable of the deep generation model on the basis of parallel data of the fundamental frequency pattern in the voice signal and the parameter included in the fundamental frequency pattern in the voice signal and estimates the latent variable from the fundamental frequency pattern in the voice signal.

Decoder: reconstructs the fundamental frequency pattern in the voice signal from the latent variable.

Meanwhile, the present invention is not limited to the above-described embodiment and various modifications and applications can be made without departing from the spirit and scope of the present invention.

REFERENCE SIGNS LIST

10 Input unit
20 Operation unit
30 Learning unit
40 Deep generation model storage unit
50 Parameter estimation unit
60 Fundamental frequency pattern estimation unit
90 Output unit
100 Voice signal analysis apparatus

The invention claimed is:

1. A computer-implemented method for estimating aspects of speech signal in voice data, the method comprising:
learning a deep generation model, wherein the deep generation model comprises:
an encoder, wherein the encoder estimates a first parameter included in a first fundamental frequency pattern of a first speech signal in a first input voice data, the first parameter corresponds to a latent variable of the deep generation model, and the learning of the deep generation model includes updating the latent variable of the deep generation model based on parallel data between the first fundamental frequency pattern of the first speech signal and the first parameter included in the first fundamental frequency pattern of the first speech signal as training data, and
a decoder, wherein the decoder reconstructs, based on the latent variable of the deep generation model, the first fundamental frequency pattern of the first speech signal in the first input voice data, wherein the latent variable of the deep generation model corresponds to the first parameter included in the first fundamental frequency pattern of the first speech signal;
estimating, based on a second fundamental frequency pattern of a second speech signal in a second input voice data for encoding and subsequently for reconstructing, a second parameter included in the second fundamental frequency pattern using the encoder of the learnt deep generation model; and
estimating, based on the second parameter included in the second fundamental frequency pattern of speech signal in the second input voice data, the second fundamental frequency pattern using the decoder of the deep generation model to reconstruct the second fundamental frequency pattern associated with the second input voice data.

2. The computer-implemented method of claim 1, wherein the first parameter in the first fundamental frequency pattern of speech signal in the first voice data represents at least one of:
an accent of voice in the first voice data, or
musical notes representing a musical piece signal associated with the first voice data as a singing voice.

3. The computer-implemented method of claim 1, the method further comprising:
receiving the first voice data, wherein the first voice data includes singing voice data;
receiving the first fundamental frequency pattern based on the received first voice data, wherein the first fundamental frequency pattern includes vibrato and overshoot associated with the received singing voice data;
generating the first parameter included in the first fundamental frequency pattern of speech signal in the received singing voice data, wherein the first parameter represents musical notes associated with the received singing voice data;
learning, based on a combination including the first fundamental frequency pattern associated with the first voice data and the first parameter, the deep generation model;
synthesizing voice data of the singer based on the learnt deep generation model; and
outputting the synthesized voice data.

4. The computer-implemented method of claim 1, the method further comprising:
maximizing an output of an objective function for learning the deep generation model, wherein the objective function is based at least on:
a distance between an output of the decoder having the first fundamental frequency pattern of speech signal in the first voice data as an input and a prior distribution of the first parameter represented using a state sequence of a path-restricted hidden Markov model (HMM), and
an output of the encoder having the latent variable as an input of the decoder.

5. The computer-implemented method of claim 4, wherein each of the encoder and the decoder is configured using a convolutional neural network.

6. The computer-implemented method of claim 4, wherein the first voice data represents learning data, wherein the first voice data and the second voice data are distinct, and wherein the first voice data and the third voice data are distinct.

7. The computer-implemented method of claim 4, wherein the first fundamental frequency pattern of speech signal in the first voice data relates to one or more of:

an interrogative sentence based on the ending of an utterance sentence, an intention of a speaker represented by the first voice data, a melody of a singer represented by the first voice data, and an emotion of the singer represented by the first voice data.

8. A system for estimating aspects of voice data, the system comprises:

a processor; and a memory storing computer-executable instructions that when executed by the processor cause the system to:

learn a deep generation model, wherein the deep generation model comprises:

an encoder, wherein the encoder estimates a first parameter included in a first fundamental frequency pattern of a first speech signal in a first input voice data, the first parameter corresponds to a latent variable of the deep generation model, and the learning of the deep generation model includes updating the latent variable of the deep generation model based on parallel data between the first fundamental frequency pattern of the first speech signal and the first parameter included in the first fundamental frequency pattern of the first speech signal as training data, and a decoder, wherein the decode reconstructs, based on the latent variable of the deep generation model, the first fundamental frequency pattern of the first speech signal in the first input voice data, wherein the latent variable of the deep generation model corresponds to the first parameter included in the first fundamental frequency pattern of the first speech signal;

estimate, based on a second fundamental frequency pattern of a second speech signal in a second input voice data for encoding and subsequently for reconstructing, a second parameter included in the second fundamental frequency pattern using the encoder of the learnt deep generation model; and estimate, based on the second parameter included in the second fundamental frequency pattern of speech signal in the second input voice data, the second fundamental frequency pattern using the decoder of the deep generation model to reconstruct the second fundamental frequency pattern associated with the second input voice data.

9. The system of claim 8, the computer-executable instructions when executed further causing the system to:

maximize an output of an objective function for learning the deep generation model, wherein the objective function is based at least on:

a distance between an output of the decoder having the first fundamental frequency pattern of the first voice data as an input and a prior distribution of the first parameter represented using a state sequence of a path-restricted hidden Markov model (HMM), and an output of the encoder having the latent variable as an input of the decoder.

10. The system of claim 8, wherein each of the encoder and the decoder is configured using a convolutional neural network.

11. The system of claim 8, wherein the first voice data is a learning data, wherein the first voice data and the second voice data are distinct, and wherein the first voice data and the third voice data are distinct.

12. The system of claim 8, wherein the first fundamental frequency pattern of speech signal in the first voice data relates to one or more of:

an interrogative sentence based on the ending of an utterance sentence, an intention of a speaker represented by the first voice data, a melody of a singer represented by the first voice data, and an emotion of the singer represented by the first voice data.

13. The system of claim 8, wherein the first parameter in the first fundamental frequency pattern of speech signal in the first voice data represents at least one of:

an accent of voice in the first voice data, or musical notes representing a musical piece signal associated with the first voice data as a singing voice.

14. The system of claim 8, the computer-executable instructions when executed further causing the system to:

receive the first voice data, wherein the first voice data includes singing voice data;

generate the first fundamental frequency pattern based on the received first voice data, wherein the first fundamental frequency pattern includes vibrato and overshoot associated with the received singing voice data;

generate the first parameter included in the first fundamental frequency pattern of speech signal in the received singing voice data, wherein the first parameter represents musical notes associated with the received singing voice data;

learn, based on a combination including the first fundamental frequency pattern associated with the first voice data and the first parameter, the deep generation model;

synthesize voice data of the singer based on the learnt deep generation model; and output the synthesized voice data.

15. A computer-readable non-transitory recording medium storing computer-executable instructions that when executed by a processor cause a computer system to:

learn a deep generation model, wherein the deep generation model comprises:

an encoder, wherein the encoder estimates a first parameter included in a first fundamental frequency pattern of a first speech signal in a first input voice data, the first parameter corresponds to a latent variable of the deep generation model, and the learning of the deep generation model includes updating the latent variable of the deep generation model based on parallel data between the first fundamental frequency pattern of the first speech signal and the first parameter included in the first fundamental frequency pattern of the first speech signal as training data, and a decoder, wherein the decoder reconstructs, based on the latent variable of the deep generation model, the first fundamental frequency pattern of the first speech signal in the first input voice data, wherein the latent variable of the deep generation model corresponds to the first parameter included in the first fundamental frequency pattern of the first speech signal;

estimate, based on a second fundamental frequency pattern of a second speech signal in a second input voice data for encoding and subsequently for reconstructing, a second parameter included in the second fundamental frequency pattern using the encoder of the learnt deep generation model; and estimate, based on the second parameter included in the second fundamental frequency pattern of speech signal in the second input voice data, the second fundamental frequency pattern using the decoder of the deep generation model to reconstruct the second fundamental frequency pattern associated with the second input voice data.

16. The computer-readable non-transitory recording medium of claim 15, wherein each of the encoder and the decoder is configured using a convolutional neural network.

17. The computer-readable non-transitory recording medium of claim 15, wherein the first fundamental frequency pattern of speech signal in the first voice data relates to one or more of:
- an interrogative sentence based on the ending of an utterance sentence,
- an intention of a speaker represented by the first voice data,
- a melody of a singer represented by the first voice data, and
- an emotion of the singer represented by the first voice data.

18. The computer-readable non-transitory recording medium of claim 15, the computer-executable instructions when executed further causing the system to:
- maximize an output of an objective function for learning the deep generation model, wherein the objective function is based at least on:
  - a distance between an output of the decoder having the first fundamental frequency pattern of speech signal in the first voice data as an input and a prior distribution of the first parameter represented using a state sequence of a path-restricted hidden Markov model (HMM), and
  - an output of the encoder having the latent variable as an input of the decoder.

19. The computer-readable non-transitory recording medium of claim 18, wherein the first parameter in the first fundamental frequency pattern of speech signal in the first voice data represents at least one of:
- an accent of voice in the first voice data, or
- musical notes representing a musical piece signal associated with the first voice data as a singing voice.

20. The computer-readable non-transitory recording medium of claim 18, the computer-executable instructions when executed further causing the system to:
- receive the first voice data, wherein the first voice data includes singing voice data;
- generate the first fundamental frequency pattern based on the received first voice data, wherein the first fundamental frequency pattern includes vibrato and overshoot associated with the received singing voice data;
- generate the first parameter included in the first fundamental frequency pattern of speech signal in the received singing voice data, wherein the first parameter represents musical notes associated with the received singing voice data;
- learn, based on a combination including the first fundamental frequency pattern associated with the first voice data and the first parameter, the deep generation model;
- synthesize voice data of the singer based on the learnt deep generation model; and
- output the synthesized voice data.

* * * * *